No. 781,604. PATENTED JAN. 31, 1905.
P. C. & E. R. HEWITT.
LUBRICATING SYSTEM FOR EXPLOSIVE ENGINES.
APPLICATION FILED JUNE 13, 1904.

3 SHEETS—SHEET 1.

Witnesses
James F. Duhamel.
Waldo M. Chapin.

Inventors:
Peter Cooper Hewitt
Edward R. Hewitt
By their Attorney

No. 781,604. PATENTED JAN. 31, 1905.
P. C. & E. R. HEWITT.
LUBRICATING SYSTEM FOR EXPLOSIVE ENGINES.
APPLICATION FILED JUNE 13, 1904.

3 SHEETS—SHEET 2.

Witnesses
James F. Duhamel,
Waldo M. Chapin

Inventors:
Peter Cooper Hewitt
Edward R. Hewitt
By their Attorney

No. 781,604. PATENTED JAN. 31, 1905.
P. C. & E. R. HEWITT.
LUBRICATING SYSTEM FOR EXPLOSIVE ENGINES.
APPLICATION FILED JUNE 13, 1904.
3 SHEETS—SHEET 3.
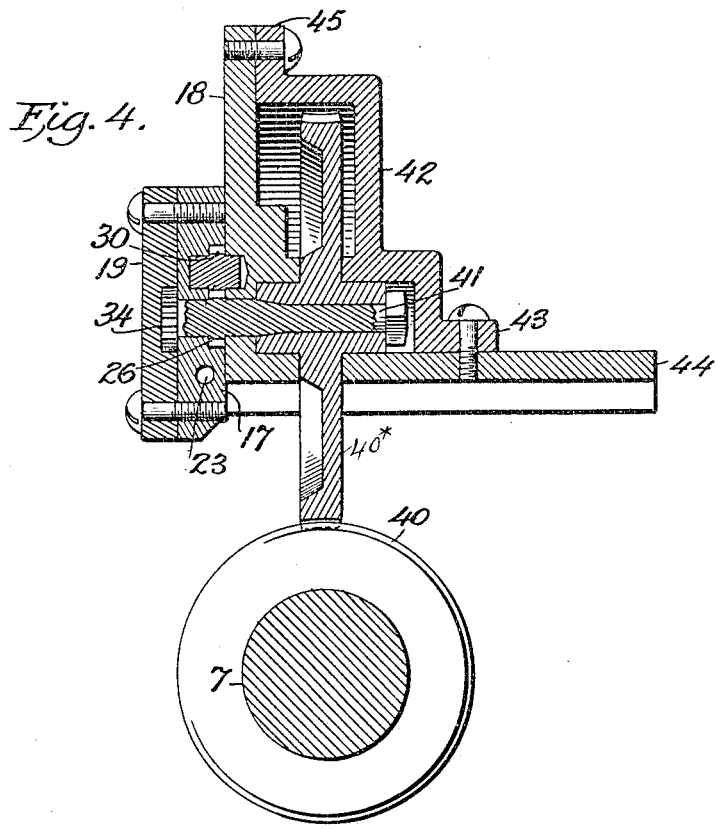

No. 781,604. Patented January 31, 1905.

UNITED STATES PATENT OFFICE.

PETER COOPER HEWITT AND EDWARD R. HEWITT, OF NEW YORK, N. Y.

LUBRICATING SYSTEM FOR EXPLOSIVE-ENGINES.

SPECIFICATION forming part of Letters Patent No. 781,604, dated January 31, 1905.

Application filed June 13, 1904. Serial No. 212,293.

*To all whom it may concern:*

Be it known that we, PETER COOPER HEWITT and EDWARD R. HEWITT, citizens of the United States, residing at the city of New York, in the borough of Manhattan and State of New York, have invented certain new and useful Improvements in Lubricating Systems for Explosive-Engines, of which the following is a full, clear, and exact description.

This invention relates to an apparatus for lubricating the running parts of machines, and particularly those of internal-combustion and other engines, especially such as are employed for running automobiles, where it is important to use the oil with absolute certainty and regularity and as economically as possible while insuring sufficient lubrication of the parts.

The main object of the invention is to render the feeding of the oil entirely automatic, so that it is only necessary to place a supply of oil in a tank, whence it will feed to the several bearings either rapidly or slowly, according to the speed at which the engine is running, and hence according to the needs of the bearings. In order to attain this object, we provide means for positively feeding the oil to the several bearings and preferably in different quantities for different bearings in cases where the loads upon the bearings are materially different.

Figure 1:
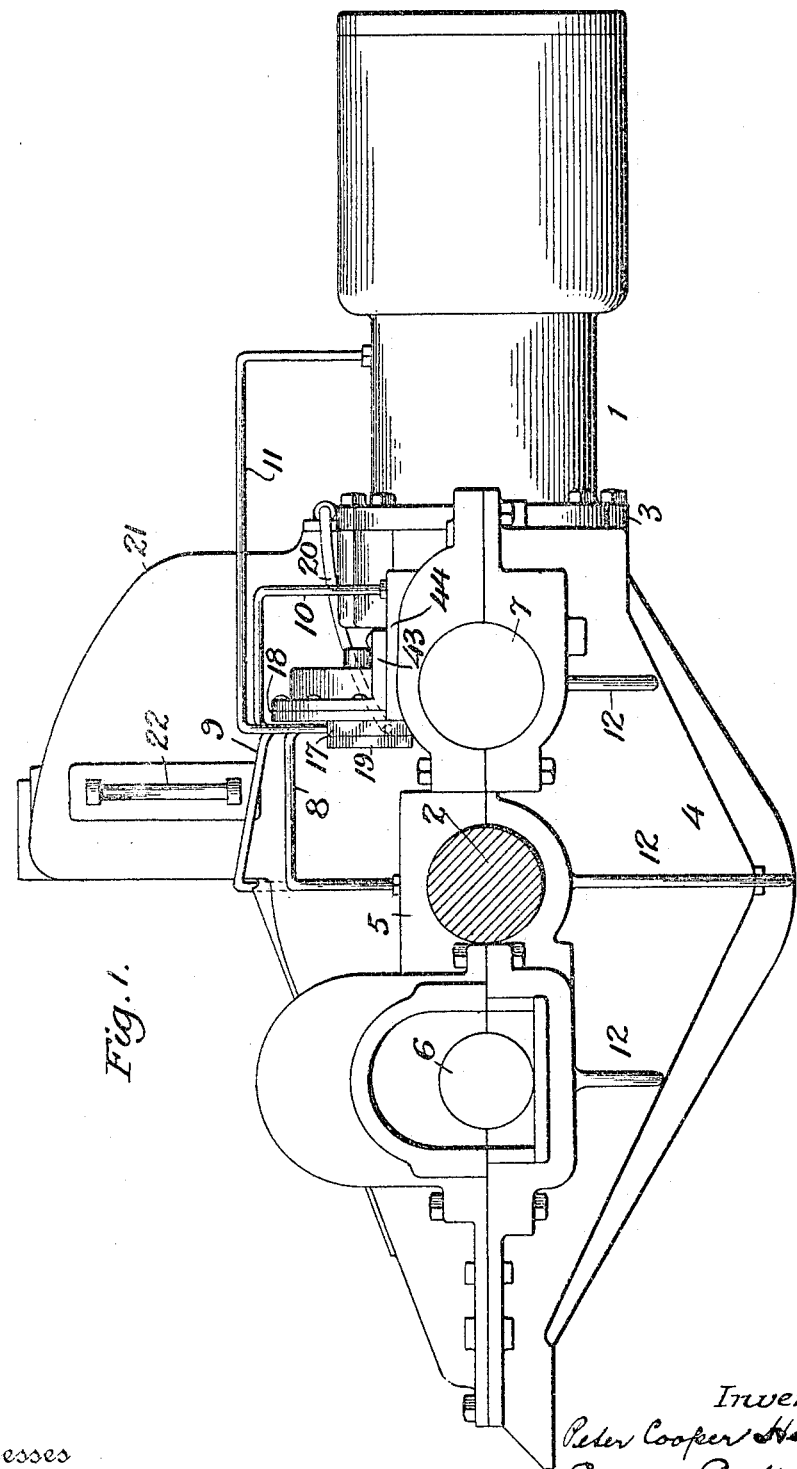
Figure 2:
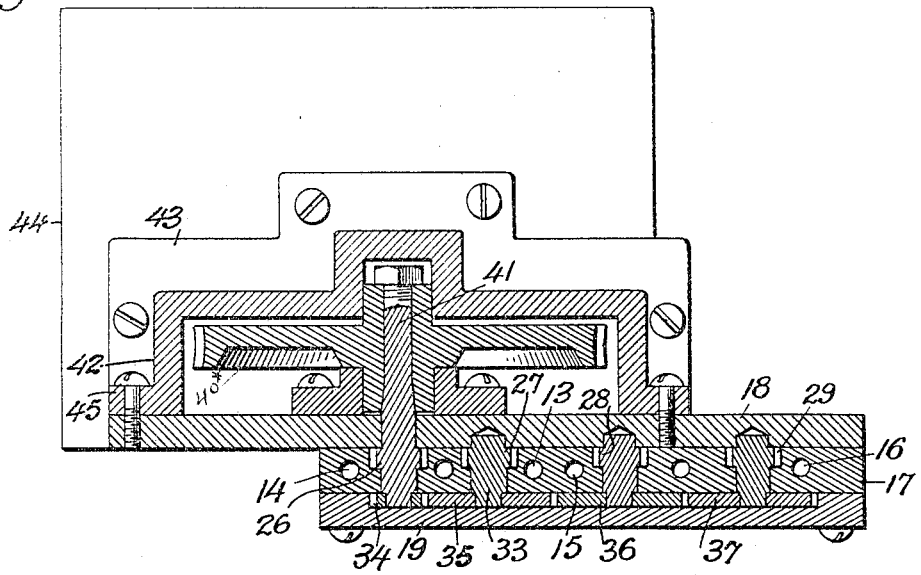
Figure 3:
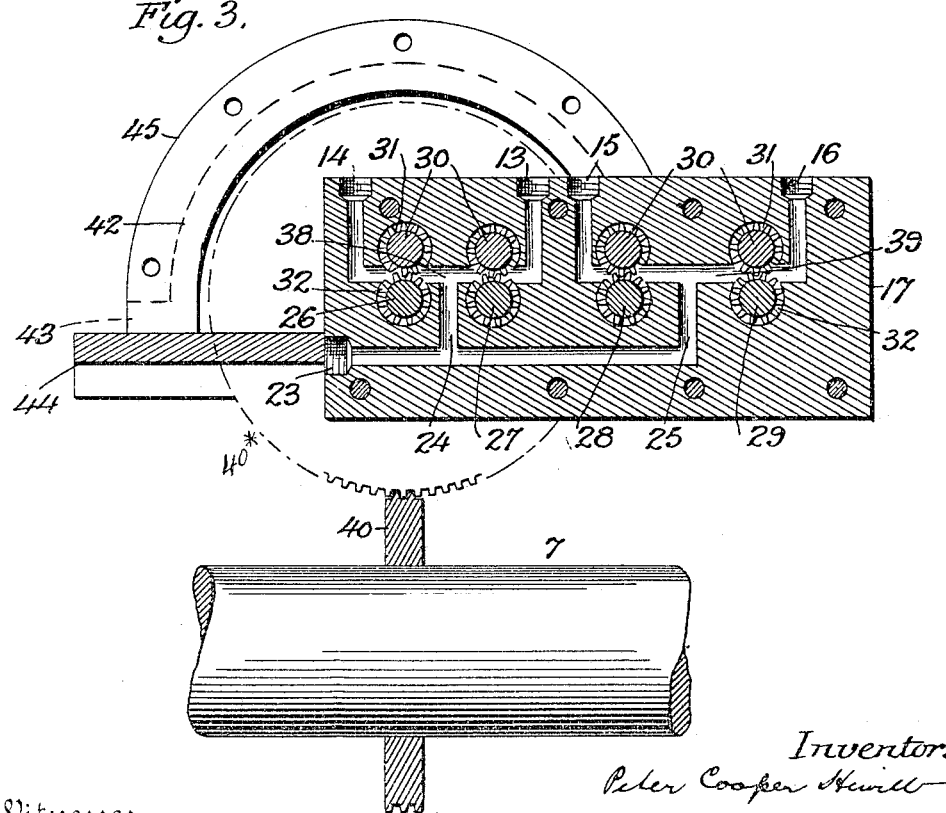

In the accompanying drawings, Figure 1 is an elevation of an explosion-engine embodying our improvements in one form. Fig. 2 is a sectional plan of a multiplex lubricator. Fig. 3 is an elevation showing the lubricator in section. Fig. 4 is a transverse section of the lubricator and its operating-train.

In the several views like parts are identified by like signs.

The improvements are illustrated as applied to an explosion-engine, of which 1 is the cylinder, and 2 the crank-shaft. The cylinder is bolted, by means of a flange 3, to a casing 4, within which work the crank and connecting-rod. The casing is shown as formed of upper and lower hollow sections secured together at their edges, each section having part of a bearing 5 for the crank-shaft, which is seen at Fig. 1, said shaft having another bearing upon the opposite side of the casing. The engine is also usually provided with auxiliary shafts 6 and 7, connected to the main shaft, the shaft 7 being adapted to operate the mechanism controlling admission of fuel and air to the engine.

Oil is fed to the two bearings 5 (only one of which is shown) of the crank-shaft 2 through pipes 8 and 9, to the journal-box of the shaft 7 through a pipe 10, and to the cylinder 1 through a pipe 11. By means of pipes 12 the drip from the shafts is led down within the casing and accumulates in the bottom thereof, making an oil-bath into which the crank-wrist dips at each revolution.

The pipes 8, 9, 10, and 11 lead, respectively, from outlets 13, 14, 15, and 16 of a lubricator which preferably comprises a vertical plate 17, formed with said outlets, a base-plate 18, to the face of which said plate 17 is secured, and a plate 19, covering the outer face of the plate 17. The lubricant is supplied through a pipe 20, leading from an oil-tank 21, usually provided with a gage-glass 22. As will be seen at Fig. 3, the lubricator-plate 17 is provided with an inlet or main duct 23, forming a continuation of the supply-pipe 20. Said duct 23 is formed with ramifications 24 and 25, the former ramifying into the outlets 13 14 and the latter ramifying into the outlets 15 16. Each of said outlets is provided with a pair of oil-feeding pinions in mesh with each other, the lower pinions 26, 27, 28, and 29 being the drivers of the upper pinions 30. Each pair of pinions works in a pair of depressions or races, as at 31 32, the several races communicating with their respective outlets, so that when a pair of pinions is operated the oil is caused to feed from one side of the pair around through the races to the other side of the pair, while when the pinions are stationary feeding of the oil is obstructed or prevented by the meshing teeth of the pinions which close the duct. As will be seen at Fig. 2, the races are formed in one face of the plate 17, while the pinions 26 27 28 29 have shafts 33, which extend through the plate, gears 34, 35, 36, and 37 being secured to said shafts and covered by the plate 19. Said gears form a train whereby all the oil-feeding pinions are caused to turn together; but preferably the gear or pinion 34, which is connected to the feeding-pinion 26, is smaller than the gear 35, while the latter is preferably equal in diameter to the remaining gears 36 and 37, whereby the feeding-pinion 26 is caused to rotate faster than the pinions 27, 28, and 29, and hence to cause a greater flow of oil, which in this instance passes to the engine-cylinder. The gears, however, may be all alike or otherwise varied to cause either an equal flow through all the outlets or a different relative flow from that described.

Preferably the driver-pinions 26 to 29 are in line, whereby they may be conveniently geared together, while the portions of the outlets into which said gears protrude are also in line, said outlets having, however, elbow portions or bends terminating at the top of the plate 17. Since each of the gears is in mesh with the next, it follows that adjacent pairs of feeding-pinions feed the oil in opposite directions, the outlets being correspondingly arranged, and the oil flowing through the ramifications 24 and 25 into compartments 38 and 39 between adjoining pairs of feeding-pinions, so as to supply oil for both pairs. Preferably the main duct or inlet 23 extends in horizontal direction, the ramifications 24 and 25 extend upwardly, the compartments 38 and 39 horizontally, and the outlets horizontally and upwardly. Other arrangements may, however, may be adopted for conducting oil to and from the feeding-pinions, and the latter may be otherwise operated.

The oil-feeding pinions are operated from the shaft 7 by means of movement-reducing gearing consisting of a worm 40, fixed upon the shaft, and a worm-wheel 40*, secured upon an extension 41 of the shaft of the first driver-pinion 26. Said worm-wheel is inclosed within a casting 42, having a horizontal flange 43, whereby it is secured upon a seat 44, provided upon the main casing 4, and a vertical flange 45, to the face of which is secured the base-plate 18 of the lubricator, said plate 18 also forming part of the housing for said worm-wheel.

It will thus be seen that oil may be supplied automatically to the various running parts of an engine, each part receiving as much as it needs whether the engine be running fast or slow and without waste, while when the engine stops the supply of oil is practically cut off. The invention is therefore particularly valuable for engines whose speed is frequently changed or which are frequently stopped for short or long periods—as, for instance, automobile-engines, an engine of which type is illustrated in the drawings. The feeders may be otherwise formed, and it is not essential in all cases that they revolve constantly.

Wide variations may be resorted to within the scope of our invention, and portions of the improvements may be used without others.

Having described our invention, we claim—

1. A lubricator comprising an oil-supply tank and provided with passages ramifying therefrom to the various points to be lubricated, and pumping devices of different capacities respectively located in the branches of said passages.

2. A lubricator provided with a plurality of ducts, a revoluble oil-feeder for each duct, a common driver for said feeders, and means for enabling said driver to rotate said feeders at unequal speeds.

3. A lubricator provided with a duct having ramified outlets, a pair of oil-feeding pinions in each outlet, and means for rotating said pinions.

4. A lubricator provided with a duct having ramified outlets, a pair of oil-feeding pinions in each outlet, a driver connected to one pair of pinions, and gearing connecting said pairs so that the pinions in one pair revolve faster than those in the other pair.

5. A lubricator provided with two ducts, a pair of oil-feeding pinions in each duct, two shafts each carrying a pinion in one of said ducts, a driving-pinion upon one of said shafts, and a gear mounted upon the other shaft and of larger diameter than said driving-pinion and meshing therewith.

6. A lubricator provided with a duct having a plurality of ramifications, each ramification having ramified outlets, a rotative oil-feeder in each outlet, and a common driver for said feeders.

7. A lubricator provided with a duct having a plurality of ramifications, each ramification having ramified outlets, a pair of oil-feeding pinions in each outlet, said pinions being connected from pair to pair, and driving means.

8. A lubricator provided with two outlets, a pair of oil-feeding pinions in each outlet, and a driving-gear secured in one of the pinions in each of said pairs, said driving-gears being in mesh, and said lubricator being provided with an oil-supply compartment between the pairs of oil-feeding pinions.

9. A lubricator provided with a series of pairs of outlets, a pair of oil-feeding pinions in each outlet, one pinion in each pair being a driver for the other, an oil-supply duct being located between the pairs of oil-feeding pinions in each pair of outlets and a driving-gear secured to each of said driver-pinions, said driving-gears being in mesh.

10. A lubricator comprising a series of oil-feeding pinions, a driving-gear secured to each of said pinions, said driving-gears being in mesh, oil-feeding pinions coacting with said pinions and forming therewith a series of pairs, a series of pairs of outlets each containing a pair of the oil-feeding pinions, oil-supply ducts being located between the pairs of oil-feeding pinions in each pair of outlets, to which ducts a supply-duct leads by ramifying ducts, and movement-reducing gearing for operating said gears and pinions.

11. A lubricator comprising a plate provided upon one side with a plurality of pairs of races, pairs of oil-feeding pinions fitting in said races, one pinion in each pair being provided with a shaft which extends through the plate, meshing gears secured upon said shafts upon the opposite side of said plate, said plate being provided with ducts communicating with said races.

12. A lubricator comprising a plate provided upon one side with a plurality of pairs of races, pairs of oil-feeding pinions fitting in said races, one pinion in each pair being provided with a shaft which extends through the plate, meshing gears secured upon said shafts upon the opposite side of said plate, said plate having a duct with ramifying outlets communicating with said races, and plates covering said pinions and said gears.

13. A lubricator comprising a plate provided upon one side with a plurality of pairs of races, and with a ramifying duct, each ramification whereof has ramifying outlets, one for each pair of said races, pairs of oil-feeding pinions fitting in said races, one pinion in each pair being provided with a shaft which extends through the plate, meshing gears secured upon said shafts upon the opposite side of said plate, plates covering said pinions and said gears, one of said covering-plates forming a base-plate, and one of said oil-feeding pinions having a shaft extending through said base-plate, and a main driving-gear secured upon the last-mentioned shaft.

In witness whereof we subscribe our signatures in presence of two witnesses.

PETER COOPER HEWITT.
EDWARD R. HEWITT.

Witnesses:
FRANK S. OBER,
WALDO M. CHAPIN.